United States Patent [19]
Furukawa et al.

[11] Patent Number: 6,137,754
[45] Date of Patent: Oct. 24, 2000

[54] SEARCH METHOD FOR INFORMATION RECORD MEDIUM

[75] Inventors: Junichi Furukawa; Kiyoshi Tateishi; Noriaki Murao, all of Tsurugashima, Japan

[73] Assignee: Pioneer Electronic Corporation, Tokyo, Japan

[21] Appl. No.: 09/063,374

[22] Filed: Apr. 21, 1998

[30] Foreign Application Priority Data

Apr. 23, 1997 [JP] Japan .................................. 9-106383

[51] Int. Cl.[7] ........................................................ G11B 7/00
[52] U.S. Cl. ........................ 369/44.32; 369/112; 369/109; 369/44.23; 369/44.26
[58] Field of Search ..................................... 369/109, 110, 369/112, 58, 50, 60, 44.32, 44.23, 44.26

[56] References Cited

U.S. PATENT DOCUMENTS

| | | | |
|---|---|---|---|
| 4,850,695 | 7/1989 | Mikuriya et al. | 369/53 |
| 4,928,192 | 5/1990 | Bartlett et al. | 360/48 |
| 5,253,239 | 10/1993 | Edahiro et al. | 369/54 |
| 5,848,045 | 12/1998 | Kirino et al. | 369/59 |
| 5,886,496 | 3/1999 | Furukawa et al. | 369/109 |
| 5,909,413 | 6/1999 | Araki | 369/44.34 |
| 5,914,923 | 6/1999 | Araki et al. | 369/58 |
| 5,943,179 | 8/1999 | Fukushima | 360/78.4 |

*Primary Examiner*—Nabil Hindi
*Attorney, Agent, or Firm*—Nixon & Vanderhye P.C.

[57] ABSTRACT

A searching method for an information record medium has: an initial value data preparing process of (i) performing a search for a plurality of sampling positions arranged in a radial direction on the information record medium, (ii) actuating a tilt servo to correct an error due to a tilt of an optical axis of a light beam emitted onto the information record medium from a normal line of a surface of the information record medium at each of the sampling positions, (iii) extracting a tilt correction amount after the tilt servo is stabilized for each of the sampling positions and (iv) storing the extracted tilt correction amount in relation to respective one of the sampling positions corresponding to the extracted tilt correction amount into a memory as initial value data of the tilt correction amount in advance; an initial value determining process for determining an initial value of the tilt correction amount at a search target position of the search when the search is to be performed, on the basis of a content of the initial value data stored in the memory; and a tilt servo process for performing the tilt servo at the search target position by use of the initial value determined by the initial value determining process.

16 Claims, 7 Drawing Sheets

R : SEARCH TARGET POSITION
C : CALCULATED AMOUNT

SEARCH METHOD FOR INFORMATION RECORD MEDIUM

BACKGROUND OF THE INVENTION

1. Field of the Invention

The present invention relates to a method of searching record information on an information record medium such as an optical disc or the like.

2. Description of the Related Art

In the technical field of an optical disc such as a CD (Compact Disc), a DVD or the like, there is a problem that an angle between an optical axis of a light beam emitted by an optical pickup and a surface of the optical disc at an irradiation position (i.e., a tilt angle) is shifted from a perpendicular angle, due to a distortion or a surface deflection of the optical disc. The tilt angle is generated mainly in a radial direction of the optical disc and becomes a factor of a coma aberration of the optical system, which gives a harmful influence onto a reproduction quality of the optical disc since it causes a cross talk between adjacent tracks and a deterioration of a jitter. Further, if a high density recording is attempted such as a DVD, since the spot diameter of the laser beam becomes small, it is necessary to shorten the wavelength λ of the laser beam and enlarge a numerical aperture of an objective lens, so that a margin with respect to the tilt angle becomes small. Namely, even if the optical disc is tilted in a very small degree, a large deterioration in the reproduction quality is generated. Therefore, in order to correct the coma aberration due to the tilt angle during the reproducing operation of the optical disc, there are installed (i) a tilt sensor including a light source of an exclusive light beam to detect the tilt angle and a detector to detect the exclusive light beam, and (ii) a device for correcting the tilt error in correspondence with the detected tilt angle, so as to apply the tilt servo control.

On the other hand, the reproducing operation of the optical disc player may not be continuously performed along a record track of the optical disc, but may have a so-called "search function" that the optical pickup is moved to a desired position on the optical disc in correspondence with an operation by a user etc., and the searching operation and the reproducing operation are alternatively repeated for each occasion. When the searching operation is performed, it is necessary to control the tilt servo control to keep up with the reproducing operation at a search target position.

By the way, the tilt angle generally changes in the radial direction of the optical disc. Thus, the values of the tilt angles at positions on the optical disc radially distant from each other e.g., the value of the tilt angle at the inner circumference side of the optical disc and that at the outer circumference side of the optical disc are drastically different from each other. Therefore, in case of performing a searching operation for a target which is positioned radially distant from the current position, the tilt angle is drastically changed. Accordingly, the tilt servo setting time is relatively long for such a radially distant searching operation, so that it takes a relatively long time to stabilize the tilt servo after actuating the tilt servo. This leads to a certain limit of the searching speed and a certain deterioration in the signal reproduction quality due to the unstability of the tilt servo at the time of starting the searching operation.

Further, since the characteristic of the tilt angle of the optical disc varies from the optical disc to the optical disc, it is difficult to estimate the tilt angle in advance. Therefore, in the information reproducing apparatus or the information recording apparatus, there is a problem that it is difficult to perform the searching operation, which search speed is high and which does not cause the deterioration in the reproduction signal quality after searching.

SUMMARY OF THE INVENTION

It is therefore an object of the present invention to provide a searching method for an information record medium in an information reproducing apparatus, an information recording apparatus and the like capable of performing a tilt servo, which search speed is relatively high and which can restrain a deterioration in the reproduction signal quality right after the searching operation.

The above object of the present invention can be achieved by a first searching method for an information record medium having: an initial value data preparing process of (i) performing a search for a plurality of sampling positions arranged in a radial direction on the information record medium, (ii) actuating a tilt servo to correct an error due to a tilt of an optical axis of a light beam emitted onto the information record medium from a normal line of a surface of the information record medium at each of the sampling positions, (iii) extracting a tilt correction amount after the tilt servo is stabilized for each of the sampling positions and (iv) storing the extracted tilt correction amount in relation to respective one of the sampling positions corresponding to the extracted tilt correction amount into a memory as initial value data of the tilt correction amount in advance; an initial value determining process for determining an initial value of the tilt correction amount at a search target position of the search when the search is to be performed, on the basis of a content of the initial value data stored in the memory; and a tilt servo process for performing the tilt servo at the search target position by use of the initial value determined by the initial value determining process.

According to the first searching method, in advance of an actual searching operation during a reproducing or recording operation, the processes to prepare the initial value data of the tilt correction amount are performed in the initial value data preparing process. Namely, at first, the search is performed for a plurality of sampling positions arranged in the radial direction on the information record medium. Then, the tilt servo is actuated at each of the sampling positions. Then, the tilt correction amount is extracted after the tilt servo is stabilized for each of the sampling positions. Then, the extracted tilt correction amount in relation to respective one of the sampling positions is stored into the memory as the initial value data.

Afterward, at the time of the actual searching operation during the reproducing or recording operation, the initial value of the tilt correction amount is determined at the search target position when the search is to be performed, on the basis of the content of the initial value data stored in the memory, in the initial value determining process. Then, in the tilt servo process, the tilt servo is performed at the search target position by use of the initial value determined by the initial value determining process.

Therefore, when an information record medium is loaded, it is possible to obtain appropriate initial values of the tilt correction amounts for a plurality of sampling points. Then, it is possible to set the appropriate initial values of the tilt correction amounts for the search target positions in the searching operation afterward. Accordingly, it is possible to shorten the setting time for the tilt servo from the early stage right after loading the information record medium.

In this manner, it is possible to perform the search in which the setting time for the tilt servo can be shortened regardless of the stage of the operations, and the search speed can be improved without deteriorating the signal reproduction quality right after the searching operation according to the first searching method.

In one aspect of the firstsearching method, the initial value determining process includes a calculating process of calculating the initial value by interpolating the initial value data, which corresponds to a radial position at a vicinity of the search target position and is stored in the memory, in case that the initial value data corresponding to the search target position is not stored in the memory.

According to this aspect, in the initial value determining process, if the initial value data corresponding to the search target position is not stored in the memory, the initial value is calculated by interpolating the initial value data, which corresponds to the radial position at a vicinity of the search target position.

Therefore, it is possible to set the appropriate initial values of the tilt correction amounts for the search target positions in the searching operation even if there area relatively small number of the initial values stored in the memory. Accordingly, it is possible to set the initial value at a high accuracy and it is also possible to shorten the setting time for the tilt servo.

In this manner, it is possible to perform the search in which the setting time for the tilt servo can be shortened regardless of the data amount in the memory according to the this aspect.

In another aspect of the first searching method, the tilt servo process includes a process of correcting an aberration of the light beam as the error due to the tilt, by a liquid crystal panel disposed on the optical axis for correcting the aberration.

According to this aspect, in the tilt servo process, the aberration of the light beam as the error due to the tilt is corrected by the liquid crystal panel. Therefore, without installing the tilt sensor for detecting the tilt angle or a complicated mechanism for correcting the tilt angle, the tilt servo can be performed by use of the appropriate tilt correction amount at each of the search target positions.

In this manner, the tilt servo can be realized which can simplify the hardware structure and which is suitable for the miniaturization of the apparatus according to this aspect.

The above object of the present invention can be achieved by a second searching method for an information record medium having: an initial value determining process for determining an initial value of a tilt correction amount at a search target position of a search when the search is to be performed, on the basis of an existence and a content of initial value data of the tilt correction amount stored in a memory; a tilt servo process for performing a tilt servo to correct an error due to a tilt of an optical axis of a light beam emitted onto the information record medium from a normal line of a surface of the information record medium at the search target position, by use of the initial value determined by the initial value determining process; and an initial value data updating process for (i) extracting the tilt correction amount after the tilt servo is stabilized for the search target position, (ii) additionally storing the extracted tilt correction amount in relation to the search target position as the initial value data into the memory if the initial value data corresponding to the search target position is not stored in the memory yet and (iii) updating the initial value data corresponding to the search target position by use of the extracted tilt correction amount if the initial value data corresponding to the search target position is already stored in the memory.

According to the second searching method, at the time of the actual searching operation during the reproducing or recording operation, the initial value of the tilt correction amount is determined at the search target position when the search is to be performed, on the basis of the existence (or the non-existence) and the content of initial value data of the tilt correction amount stored in the memory, in the initial value determining process. Then, in the tilt servo process, the tilt servo is performed at the search target position by use of the initial value determined by the initial value determining process.

Then, in the initial value data updating process, the following processes are performed. Namely, at first, the tilt correction amount is extracted after the tilt servo is stabilized for the search target position. Here, if the initial value data corresponding to the search target position is not stored in the memory yet, the extracted tilt correction amount in relation to the search target position is additionally stored as the initial value data into the memory. Alternatively, if the initial value data corresponding to the search target position is already stored in the memory, the initial value data corresponding to the search target position is updated by use of the extracted tilt correction amount.

Therefore, in case of repeatedly performing the searching operation many times for one information record medium, the appropriate initial values of the tilt correction amounts for a plurality of search target positions can be obtained, and that, the data amount of the initial value data increases as the number of times of the searching operation increases. Namely, as the number of times of the searching operation increases, it is possible to set the initial value more accurately in the tilt servo, so that the setting time for the tilt servo can be further shortened.

In this manner, it is possible to perform the search in which the setting time for the tilt servo can be shortened especially in case of performing the search repeatedly many times for one information record medium, and the search speed can be improved without deteriorating the signal reproduction quality right after the searching operation according to the second searching method.

In one aspect of the second searching method, the method further has an initial value data preparing process of (i) performing the search for a plurality of sampling positions arranged in a radial direction on the information record medium, (ii) actuating the tilt servo at each of the sampling positions, (iii) extracting the tilt correction amount after the tilt servo is stabilized for each of the sampling positions and (iv) storing the extracted tilt correction amount in relation to respective one of the sampling positions corresponding to the extracted tilt correction amount into the memory as the initial value data of the tilt correction amount in advance.

According to this aspect, in advance of an actual searching operation during a reproducing or recording operation, the processes to prepare the initial value data of the tilt correction amount are performed in the initial value data preparing process. Namely, at first, the search is performed for a plurality of sampling positions arranged in the radial direction on the information record medium. Then, the tilt servo is actuated at each of the sampling positions. Then, the tilt correction amount is extracted after the tilt servo is stabilized for each of the sampling positions. Then, the extracted tilt correction amount in relation to respective one of the sampling positions is stored into the memory as the initial value data. Therefore, it is possible to appropriately set the initial values of the tilt correction amount for the tilt servo from the early stage right after loading the information record medium, and that, as the number of times of the searching operation increases, the data amount of the initial value data increases to improve the accuracy of the initial setting.

In this manner, it is possible to perform the search in which the setting time for the tilt servo can be shortened regardless of the stage of the operations, and the search speed can be improved without deteriorating the signal reproduction quality right in case that the searching operation is repeatedly performed many times, according to this aspect.

In another aspect of the second searching method, the initial value determining process includes a calculating process of calculating the initial value by interpolating the initial value data, which corresponds to a radial position at a vicinity of the search target position and is stored in the memory, in case that the initial value data corresponding to the search target position is not stored in the memory.

According to this aspect, it is possible to perform the search in which the setting time for the tilt servo can be shortened regardless of the data amount in the memory according to the this aspect.

In another aspect of the second searching method, the tilt servo process includes a process of correcting an aberration of the light beam as the error due to the tilt, by a liquid crystal panel disposed on the optical axis for correcting the aberration.

According to this aspect, the tilt servo can be realized which can simplify the hardware structure and which is suitable for the miniaturization of the apparatus according to this aspect.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(1) First Embodiment

At first, a first embodiment of the present invention is explained with reference to FIGS. 1 to 5B.

Figure 1:
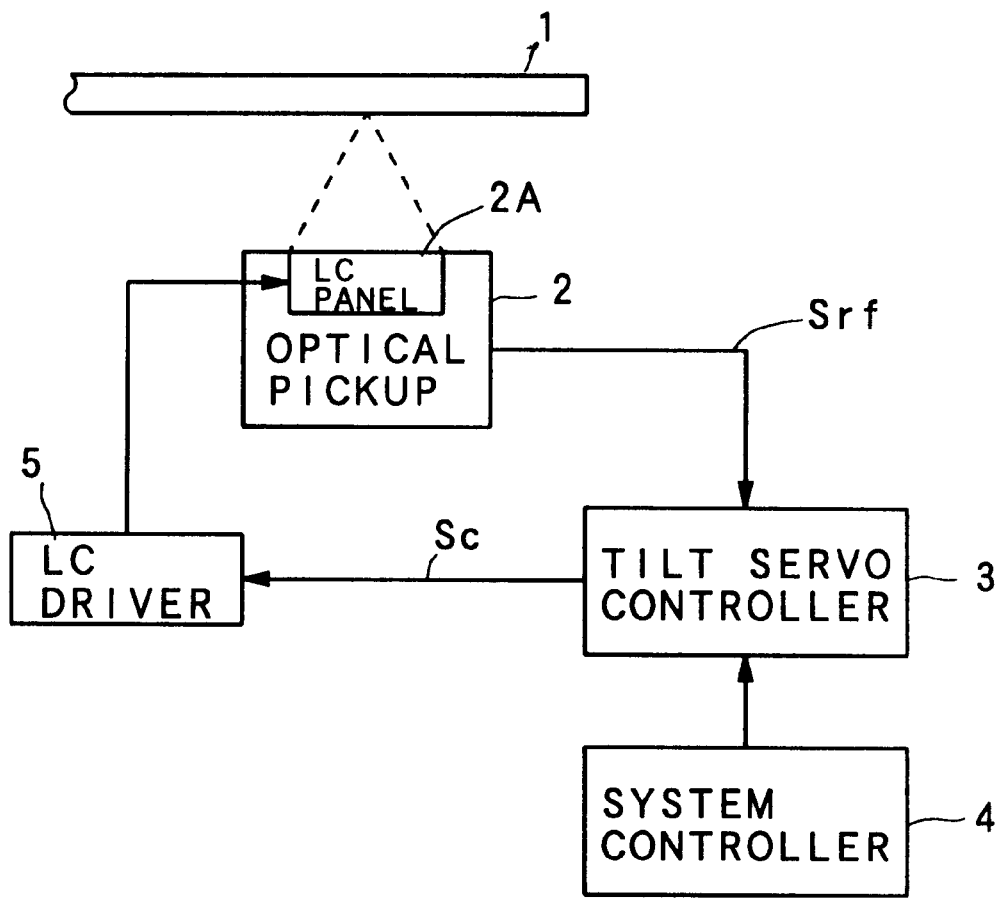
FIG. 1 is a block diagram of a tilt servo controlling apparatus as a first embodiment of the present invention.

In FIG. 1, a tilt servo controlling apparatus as a first embodiment of the present invention is provided with: an optical disc 1; an optical pickup 2 including a liquid crystal (LC) panel 2A; a tilt servo controller 3; a system controller 4; and a liquid crystal (LC) driver 5.

The optical pickup 2 is constructed to emit a light beam onto the optical disc 1, detect the reflected light beam from the optical disc 1 and output an RF (Radio Frequency) signal Srf as a detection signal. In the optical pickup 2, the liquid crystal panel 2A is disposed on an optical axis of the light beam, and the aberration of the optical system can be corrected by the liquid crystal panel 2A. The operation of the liquid crystal panel 2A will be described later in detail. The RF signal outputted from the optical pickup 2 is inputted to the tilt servo controller 3, so that the tilt servo control is appropriately performed in correspondence with the amplitude level of the RF signal. In order to correct the tilt error, the tilt servo controller 3 outputs a data control signal Sc, which is PWM (Pulse Width Modulation)—modulated, to the liquid crystal driver 5 for applying a voltage to the liquid crystal panel 2A so as to driving the liquid crystal panel 2A. As a result, the liquid crystal panel 2A can change the phase difference of the light beam passing through the liquid crystal panel 2A, to thereby function as one example of the tilt error correcting device for correcting the aberration. On the other hand, the system controller 4 controls the tilt servo controller 3. The system controller 4 adjusts the tilt error correction amount while applying an external disturbance to the control signal Sc to appropriately perform the tilt servo control. The tilt servo controller 3 and the system controller 4 in one body function as one example of the tilt error correction controlling device. The detailed operation of the tilt servo control will be described later in detail.

Next, the structure of the liquid crystal panel 2A is explained with reference to FIGS. 2A to 2C.

Figure 2A:
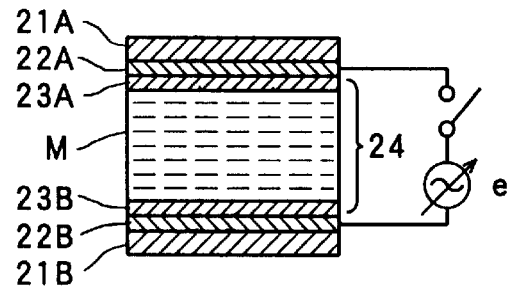
FIG. 2A is a schematic sectional view showing a structure of a liquid crystal panel in one condition in the first embodiment.
Figure 2B:
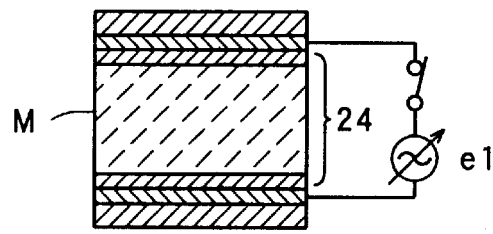
FIG. 2B is a schematic sectional view showing the structure of the liquid crystal panel in another condition in the first embodiment.
Figure 2C:
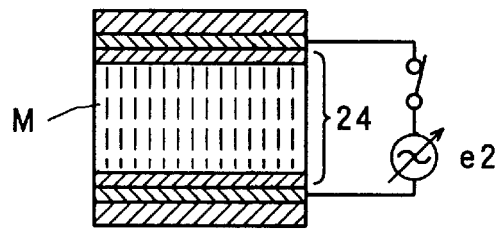
FIG. 2C is a schematic sectional view showing the structure of the liquid crystal panel in another condition in the first embodiment.

In each of FIGS. 2A to 2C, the liquid crystal panel 2A is provided with: transparent glass substrates 21A and 21B opposed to each other; transparent electrodes 22A and 22B vapor-deposited on the inner surfaces of the glass substrates 21A and 21B respectively; orientation films 23A and 23B formed on the inner surfaces of the transparent electrodes 22A and 22B respectively; and a liquid crystal 24 having a birefringence, which is interposed and sealed between the orientation films 23A and 23B.

The direction of the liquid crystal molecules M of the liquid crystal 24 is freely changed from the horizontal direction to the vertical direction in accordance with the voltage applied by the transparent electrodes 22A and 22B, as shown in FIGS. 2A to 2B, in this order. Therefore, by the birefringence effect of the liquid crystal molecules M, an optical path difference $\Delta n \cdot d$ ($\Delta n$: change in the refraction factor, d: cell thickness of the liquid crystal 24) is given to the light beam passing through the liquid crystal 24 by the change in the refraction factor. Namely, it is possible 2to give a phase difference $\Delta n \cdot d \, (2\pi/\lambda)$ ($\lambda$: wavelength of the light beam) to the light beam passing through the liquid crystal 24.

Figure 2D:
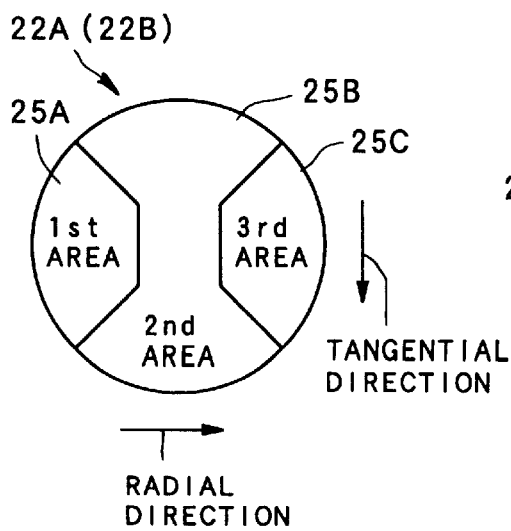
FIG. 2D is a schematic plan view showing the structure of the liquid crystal panel in the first embodiment.

In FIG. 2D, which is a schematic plan view of the liquid crystal panel 2A for correcting the aberration in the radial direction, each of the transparent electrodes 22A and 22B is divided into three areas i.e., a $1^{st}$ area 25A at the inner circumference side, a $2^{nd}$ area 25B at a central side and a $3^{rd}$ area at the outer circumference side with respect to the radial direction. Then, as the $1^{st}$ to $3^{rd}$ areas 25A to 25C are controlled independently by the driving voltages independent from each other, the phase difference of the light beam passing through each division area can be independently changed, so that the coma aberration and the like due to the tilt generated in the radial direction can be corrected. Incidentally, the appropriate correction amount as for the tilt angle in the radial direction (hereinbelow, it is referred to as a "radial tilt angle") to perform the tilt correction exhibits in general a symmetric characteristic i.e., it is appropriate to give the corrections to the $1^{st}$ area 25A and the $3^{rd}$ area 25C respectively in the reverse characteristics to each other with respect to the radial tilt angle. Further, in case of perform the tilt correction at the higher accuracy, it is appropriate to increase the number of the division areas of each of the transparent electrodes 22A and 22B with respect to the radial direction.

Figure 2E:
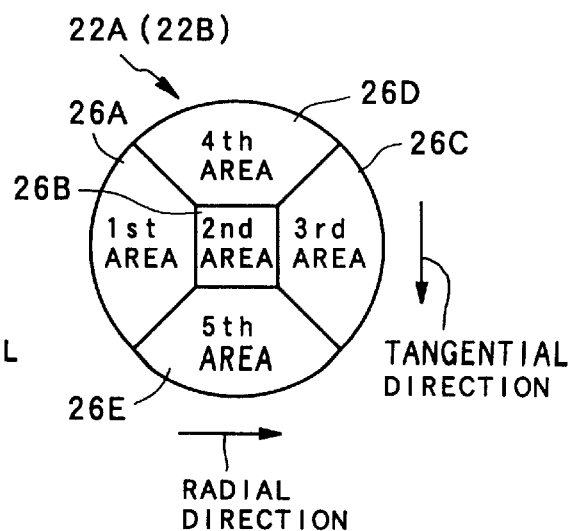
FIG. 2E is a schematic plan view showing a structure of a modified liquid crystal panel usable in the first embodiment.

Further, in case of correcting the tilt error generated in not only the radial direction but also the tangential direction (i.e., the tangential direction of the track), as shown in FIG. 2E, it is possible to divide each of the transparent electrodes 22A and 22B into 5 division areas. Namely, in case of FIG. 2E, in addition to a $1^{st}$ area 26A, a $2^{nd}$ area 26B and a $3^{rd}$ area 26C as division areas in the radial direction, there are a $4^{th}$ area 26D and a $5^{th}$ area 26E as division areas in the tangential direction, so that the tilt correction can be performed with respect to the tangential direction. It is appropriate to give the tilt correction characteristics, which are in symmetry with respect to the tilt angle in the tangential direction to each other, to the $4^{th}$ area 26D and the $5^{th}$ area 26E. In this case, it is also possible to further increase the number of division areas.

Next, the principle of the tilt error correction in the present embodiment is explained.

Figure 3:
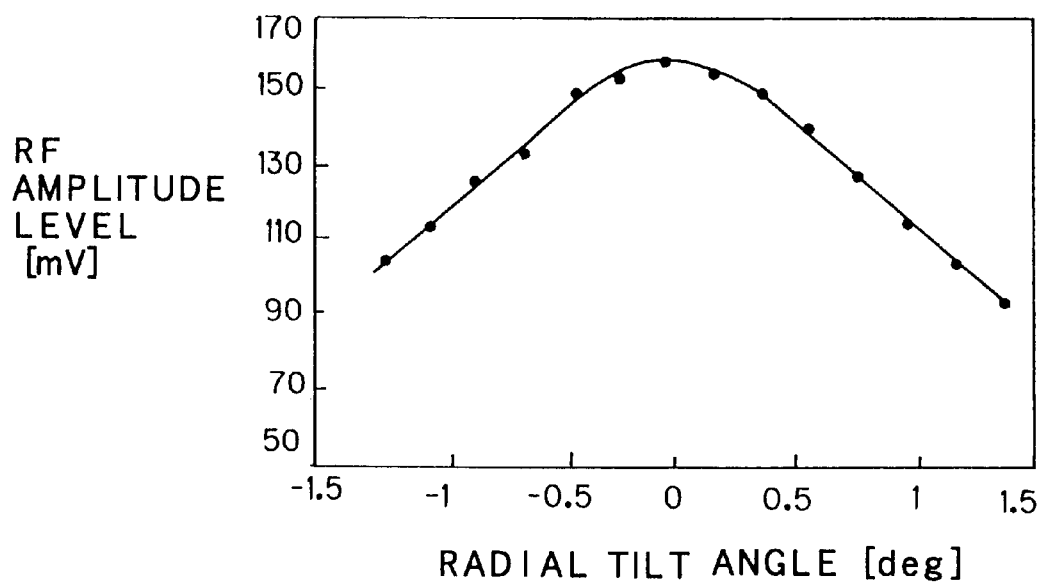
FIG. 3 is a graph showing a relationship between a radial tilt angle (degrees) and an RF amplitude level (mV) in the first embodiment of the present invention.

FIG. 3 shows one example of a relationship between a radial tilt angle (degrees) and an amplitude level of the RF signal Srf (mV) in the first embodiment of the present invention. In FIG. 3, the horizontal axis is graduated such that the radial tilt angle is "0" when the angle between the optical axis of the light beam and the surface of the optical disc at the irradiation position is perpendicular, the polarity is + (plus) when the tilt angle is generated in one radial direction from this perpendicular condition, and the polarity is − (minus) when the tilt angle is generated in another radial direction from this perpendicular condition.

As shown in FIG. 3, when the radial tilt angle is zero, the RF amplitude level takes a maximum value thereof, and that the RF amplitude level monotony decreases as the radial tilt angle becomes larger in the + or − direction. On the other hand, since the radial tilt angle and the RF amplitude level have the relationship shaped in a secondary curve on the graph, it is appropriate to correct the tilt error so that the RF amplitude level may take the maximum value (i.e., the peak value) thereof.

In the present embodiment, the tilt error correction is performed by adjusting the driving voltage for the liquid crystal panel 2A so as to give the phase difference to the light beam. Further, in order to perform the tilt error correction without the tilt sensor as in the aforementioned conventional case, the external disturbance is given to the driving voltage for the liquid crystal panel 2A, so that the tilt error correction is performed by adjusting the driving voltage in such a direction that the RF amplitude level becomes larger, in correspondence with the external disturbance. The concrete method of this tilt servo control will described later in detail.

Figure 4:
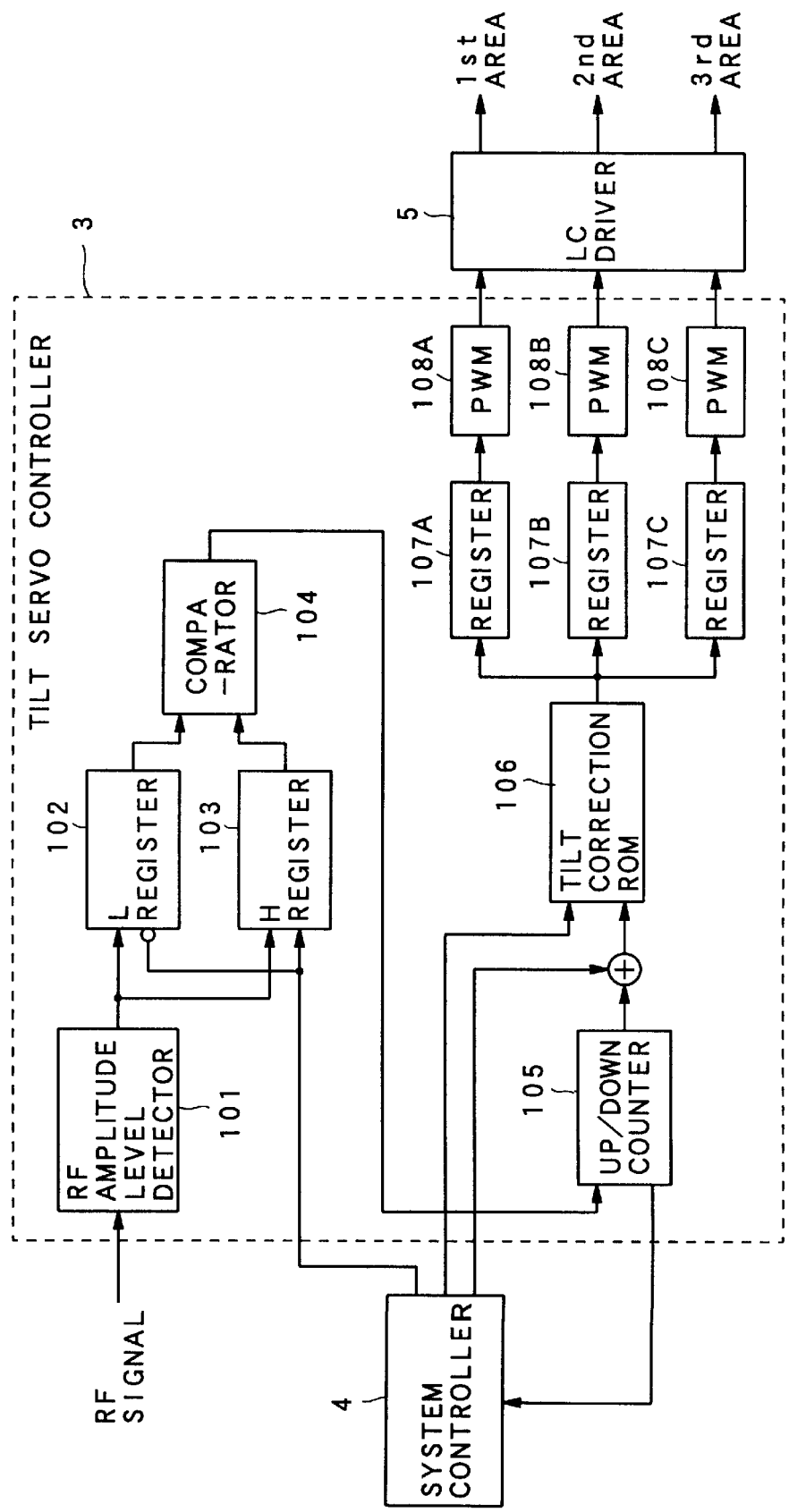
FIG. 4 is a block diagram of a tilt servo controller in the first embodiment.

In FIG. 4, the tilt servo controller 3, as one example of the tilt error correcting device, is provided with: an RF amplitude level detector 101; an L (Low) register 102; an H (High) register 103; a comparator 104; an up/down counter 105; a tilt correction ROM 106; registers 107A, 107B and 107C; and PWM units 108B and 108C.

When the RF signal Srf outputted from the optical pickup 2 is inputted to the RF amplitude level detector 101, the amplitude level of the RF signal Srf is detected, and the detection value is stored in the L register and the H register respectively under the control described later in detail. The system controller 4 and the tilt servo controller 3 perform a so-called "mountain climbing control" on the basis of the detection value of the RF amplitude level detector 101. More concretely, at first, by the comparator 104, the stored value in the L register 102 and the stored value in the B register 103 are compared with each other. Then, depending upon the comparison result, the up/down counter 105 is counted-up or counted-down. Then, in accordance with the content of the up/down counter 105, the address in the tilt correction ROM 106 is determined. Then, the data corresponding to the phase difference, which is to be given to each of the division areas of the liquid crystal panel 2A, is read out from the tilt correction ROM 106 at each determined address respectively. The data, which has been experimentally obtained to optimize the phase difference to be given to each of the division areas of the liquid crystal panel 2A in correspondence with the radial tilt angle, is stored in the tilt correction ROM 106. The data read out from the tilt correction ROM 106 is inputted to the liquid crystal driver 5 for driving each of the division areas, through the register 107A and the PWM unit 108A for the $1^{st}$ area 25A, the register 107B and the PWM unit 108B for the $2^{nd}$ area 25B, and the register 107C and the PWM unit 108C for the $3^{rd}$ area 25C, to thereby drive each of the division areas and control the phase correction amount for each of the division areas of the liquid crystal panel 2A.

Next, the searching method of the first embodiment is explained with reference to FIGS. 5A and 5B.

Figure 5A:
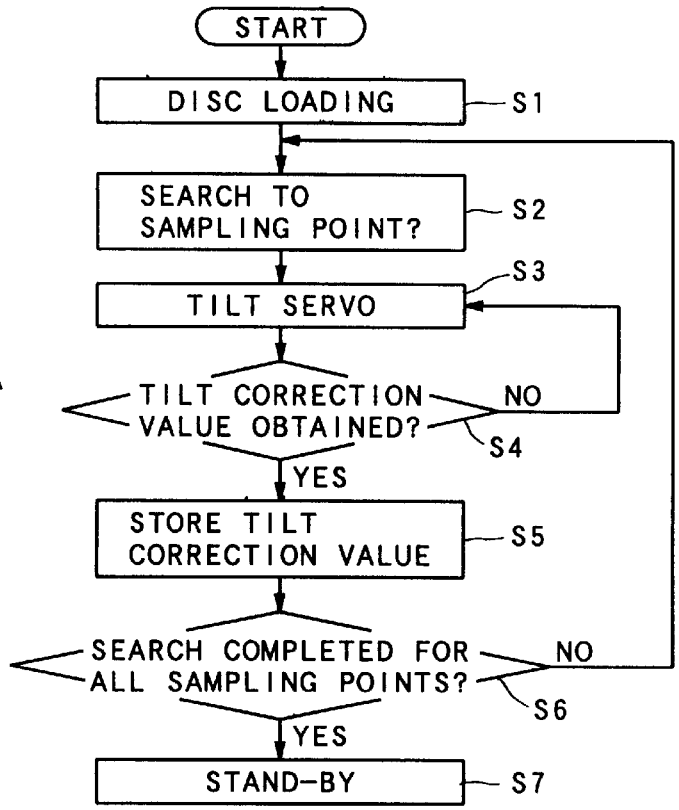
FIG. 5A is a flow chart showing one portion of a searching method in the first embodiment.

FIG. 5A is a flow chart of the searching method in which the tilt correction values at a plurality of sampling points on the optical disc are obtained beforehand.

In order to appropriately apply the tilt servo at the time of searching in correspondence with the tilt characteristic of the individual optical disc, the processes shown in FIG. 5A is performed at the time of loading the optical disc, so that the tilt correction values at a plurality of predetermined sampling points on the optical disc are obtained and stored in advance.

In FIG. 5A, more concretely, when loading the optical disc is detected (step S1), the searching operation is performed with respect to a plurality of the sampling points, which are set dispersal in the radial direction of the optical disc, as search targets (step S2). Then, at each of the sampling points, the tilt servo is actuated (step S3), and the tilt servo is continued until the tilt servo is applied in a stable manner and a desired tilt correction value is obtained (step S4: NO). When the tilt correction value is obtained at one sampling point (step S4: YES), the tilt correction value at that time point i.e., the control data corresponding to the phase correction amount to be given to the liquid crystal panel 2A is obtained and stored into the memory device as a data table in relation to the pertinent sampling point (step S5). There are a plurality of sampling points, and it is possible to set three sampling points of an inner circumference point, a middle point and an outer circumference point, for example. Therefore, until the tilt correction values as for all of the sampling points are obtained, this searching operation is repeated (step S6: NO). When the tilt correction values as for all of the sampling points are obtained (step S6: YES), it becomes in the stand-by condition (step S7), so that the next reproducing process or the like is waited for.

Figure 5B:
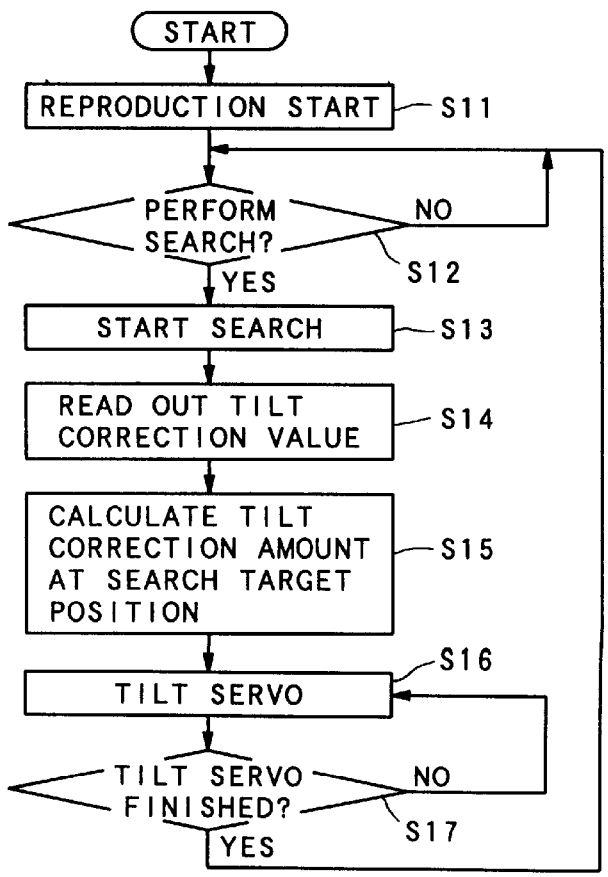
FIG. 5B is a flow chart showing another portion of the searching method in the first embodiment.

FIG. 5B is a flow chart of the searching method in which the tilt servo control is performed when the searching operation is performed after the reproducing operation is actually started, on the basis of the tilt correction values obtained and stored by the processes in FIG. 5A.

In FIG. 5B, after the reproducing operation is started (step S11), it is continuously judged whether or not the searching operation is to be performed (step S12). When the instruction to perform the searching operation is inputted by the operation of the user or the like (step S12: YES), the searching operation is started (step S13). At this time, on the basis of the search target position, one or a plurality of data corresponding to each sampling point in the data table, which has been already stored in the memory by the processes of FIG. 5A, is read out (step S14). The initial value of the tilt correction amount at the search target position is determined on the basis of this read out data (step S15). If the search target position is coincident with the search position corresponding to the read out data, the read out data can be used as it is. Alternatively, it is possible to calculate the tilt correction amount by interpolating the read out data at a plurality of sampling points which are close to the search target position. This interpolating method of the tilt correction amount will be described later in detail. The tilt correction amount obtained in this manner is set as the initial value, and the tilt servo is actuated (step S16). The tilt servo is continued until the instruction to finish the tilt servo from the system controller 4 etc. is inputted (step S17: NO). When the searching operation is finished and the tilt servo is finished (step S17: YES), the start of the searching operation is waited for again (step S12).

(2) Second Embodiment

Next, a second embodiment of the present invention is explained with reference to FIG. 6.

The hardware structure of the tilt servo controlling apparatus in which a searching method of the second embodiment is performed is the same as that of the first embodiment shown in FIGS. 1 to 4.

In the searching method of the second embodiment, in contrast to the searching method of the first embodiment, the tilt correction value is learnt at each search position each time the tilt servo is actuated at the time of searching after starting the reproducing operation, and the tilt servo is applied by use of the learnt and updated value at the time of searching afterward.

Namely, as the searching operations are repeated, when the tilt correction value at each search position is newly obtained, the data table is increased to include the newly obtained value. In case that the new data is obtained, the memory volume for the data table is increased, so that it is possible to increase the number of the tilt correction values which can be set with respect to the tilt servo. In case that tilt correction value at the pertinent search position already exists in the data table, the data table is updated by the newest tilt correction value which has been just obtained, so that it is possible to perform the appropriate tilt correction. Hereinbelow, the searching method of the second invention is explained with reference to the flow chart of FIG. 6.

Figure 6:
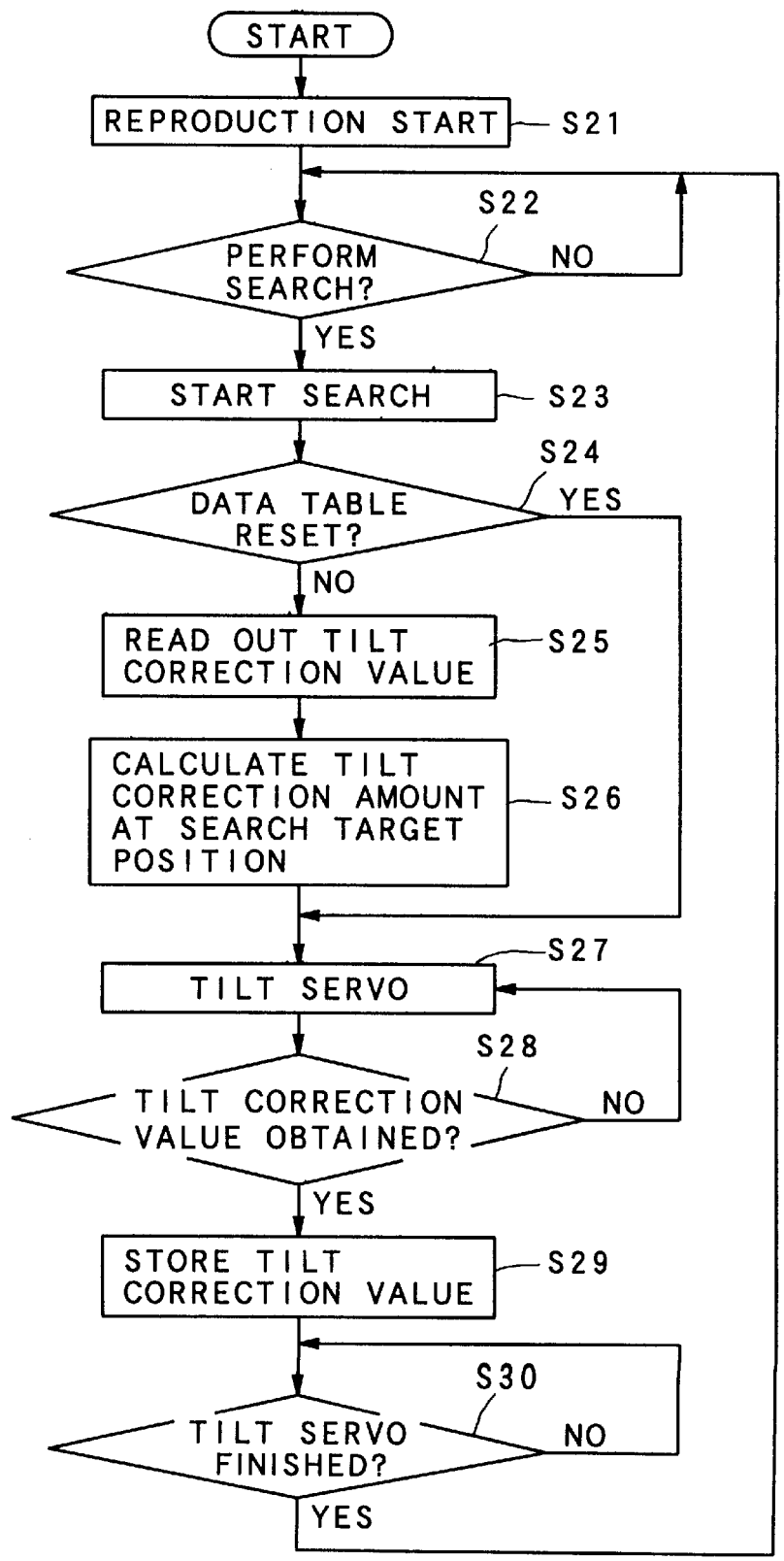
FIG. 6 is a flow chart showing a searching method in a second embodiment.

In FIG. 6, after the reproducing operation is started (step S21), it is continuously judged whether or not the searching operation is to be performed (step S22). When the instruction to perform the searching operation is inputted by the operation of the user or the like (step S22: YES), the searching operation is started (step S23). At this time, it is judged whether or not the data of the data table for the tilt correction amount exists in the memory (step S24). If it is in such a condition that the data of the data table is reset at the first starting time or the like i.e., if the initial value data for the tilt correction amount is not written in the memory at all (step S24: YES), the tilt servo is immediately actuated (step S27). On the other hand, if it is in such a condition that the data is already stored in the data table in the memory (step S24: NO), one or a plurality of data of the tilt correction value corresponding to each search target position, which has been already stored in the data table, is read out (step S25). The initial value of the tilt correction amount at the search target position is determined on the basis of this read out data (step S26). If the search target position is coincident with the search position corresponding to the read out data, the read out data can be used as it is. Alternatively, it is possible to calculate the tilt correction amount by interpolating the read out data at a plurality of sampling points which are close to the search target position. This interpolating method of the tilt correction amount will be described later in detail. The tilt correction amount obtained in this manner is set as the initial value, and the tilt servo is actuated (step S27). After actuating the tilt servo, in order to add the tilt correction value which is newly obtained to the data table, the tilt servo is continued until the tilt servo is stabilized and the desired tilt correction value is obtained (step S28: NO). When the tilt correction value is newly obtained (step S28: YES), the tilt correction value at that time is stored into the data table (step S29). The number of the sampling points can be freely determined in correspondence with the capacity of the memory and the accuracy of the tilt servo. The tilt servo is continued until the instruction to finish the tilt servo from the system controller 4 etc. is inputted (step S30: NO). Then the searching operation is finished and the tilt servo is finished (step S30: YES), the start of the searching operation is waited for again (step S22).

It is possible to perform the processes of FIG. 5A in advance of performing the processes of FIG. 6. Namely, in case that the sampling point sampled beforehand and the search target position for the new searching operation are coincident with each other, the tilt correction value stored in the data table is updated by the new value at the search target position. Alternatively, in case that they are different from each other, the new tilt correction value corresponding to the pertinent search target position is added to the data table.

(3) Interpolating Method

Figure 7:
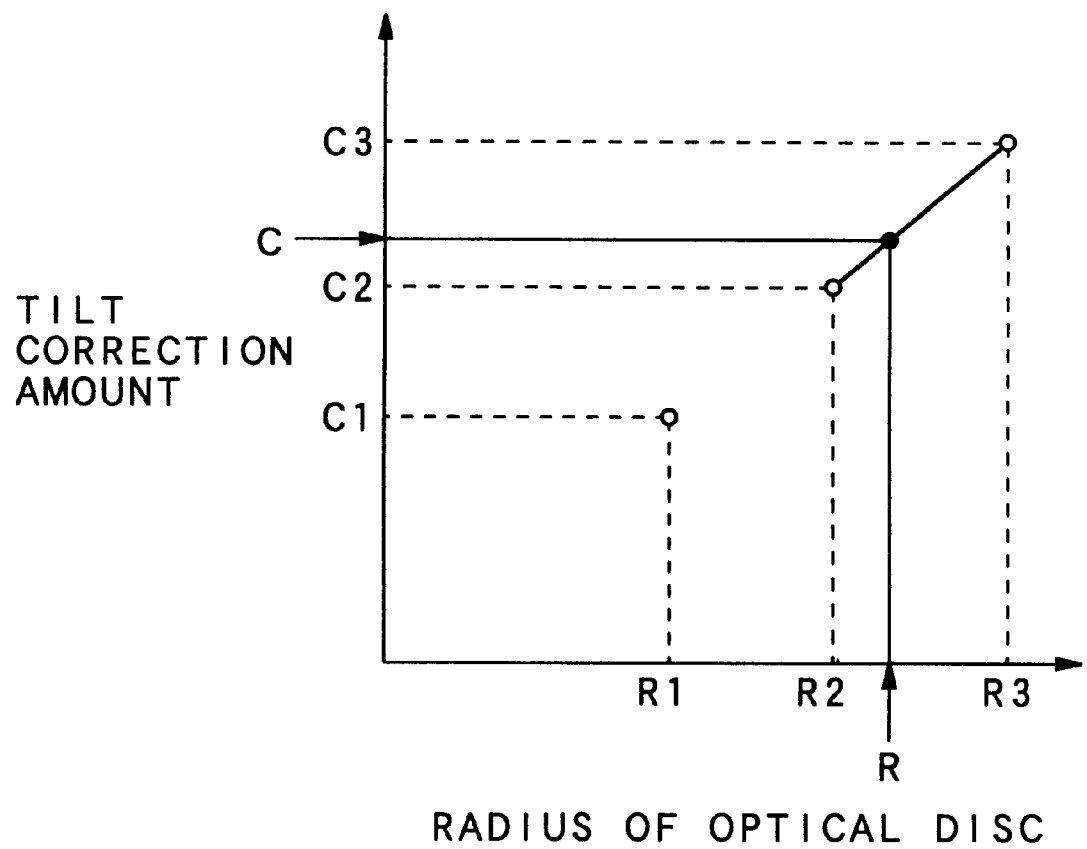
FIG. 7 is a diagram for explaining a method of interpolating the tilt correction amount in the present embodiments.

Next, the interpolating method for interpolating the initial value of the tilt correction amount at the search target position by use of the data of the tilt correction value stored in the data table is explained with reference to FIG. 7.

It is assumed here that three points of an inner circumference point, an intermediate point and an outer circumference point in the radial direction of the optical disc are set as the sampling points at which the data is stored. In FIG. 7, these three points are indicated as an inner circumference point R1, an intermediate point R2 and an outer circumference point R3, with respect to which a tilt correction values C1, C2 and C3 are respectively stored in the data table. Here, as shown in FIG. 7, when the search for a radial position R as the search target position, which is positioned between the intermediate point R2 and the outer circumference point R3, is started, it is appropriate to calculate a tilt correction value C corresponding to the radial position R by the interpolating the tilt correction values C2 and C3. Here, the tilt angle of the optical disc exhibits a roughly straight change with respect to the radial position of the optical disc. Thus, the tilt correction value C at the radial position R between the intermediate point R2 and the outer circumference point R3 can be approximated by a straight line, so that it can be calculated by use of the tilt correction values C2 and C3. More concretely, the tilt correction value C can be calculated by a following expression by means of the interpolation.

$$C=C2+(C3-C2)\times(R-R2)/(R3-R2)$$

Even in case that the total number of the sampling points is increased, it is possible to calculate the tilt correction value by use of the tilt correction values at two points, which are positioned close to and on both sides of the search target position in the same manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A searching method for an information record medium, comprising:

an initial value data preparing process of (i) performing a search for a plurality of sampling positions arranged in a radial direction on the information record medium, (ii) actuating a tilt servo to correct an error due to a tilt of an optical axis of a light beam emitted onto the information record medium from a normal line of a surface of the information record medium at each of the sampling positions, (iii) extracting a tilt correction amount after the tilt servo is stabilized for each of the sampling positions and (iv) storing the extracted tilt correction amount in relation to respective one of the sampling positions corresponding to the extracted tilt correction amount into a memory as initial value data of the tilt correction amount in advance;

an initial value determining process for determining an initial value of the tilt correction amount at a search target position of the search when the search is to be performed, on the basis of a content of the initial value data stored in said memory; and a tilt servo process for performing the tilt servo at the search target position by use of the initial value determined by said initial value determining process.

2. A searching method according to claim 1, wherein said initial value determining process includes a calculating process of calculating the initial value by interpolating the initial value data, which corresponds to a radial position at a vicinity of the search target position and is stored in said memory, in case that the initial value data corresponding to the search target position is not stored in said memory.

3. A searching method according to claim 1, wherein said tilt servo process includes a process of correcting an aberration of the light beam as the error due to the tilt, by a liquid crystal panel disposed on the optical axis for correcting the aberration.

4. A searching method for an information record medium, comprising:

an initial value determining process for determining an initial value of a tilt correction amount at a search target position of a search when the search is to be performed, on the basis of an existence and a content of initial value data of the tilt correction amount stored in a memory;

a tilt servo process for performing a tilt servo to correct an error due to a tilt of an optical axis of a light beam emitted onto the information record medium from a normal line of a surface of the information record medium at the search target position, by use of the initial value determined by said initial value determining process; and an initial value data updating process for (i) extracting the tilt correction amount after the tilt servo is stabilized for the search target position, (ii) additionally storing the extracted tilt correction amount in relation to the search target position as the initial value data into said memory if the initial value data corresponding to the search target position is not stored in said memory yet and (iii) updating the initial value data corresponding to the search target position by use of the extracted tilt correction amount if the initial value data corresponding to the search target position is already stored in said memory.

5. A searching method according to claim 4, further comprising an initial value data preparing process of (i) performing the search for a plurality of sampling positions arranged in a radial direction on the information record medium, (ii) actuating the tilt servo at each of the sampling positions, (iii) extracting the tilt correction amount after the tilt servo is stabilized for each of the sampling positions and (iv) storing the extracted tilt correction amount in relation to respective one of the sampling positions corresponding to the extracted tilt correction amount into said memory as the initial value data of the tilt correction amount in advance.

6. A searching method according to claim 4, wherein said initial value determining process includes a calculating process of calculating the initial value by interpolating the initial value data, which corresponds to a radial position at a vicinity of the search target position and is stored in said memory, in case that the initial value data corresponding to the search target position is not stored in said memory.

7. A searching method according to claim 4, wherein said tilt servo process includes a process of correcting an aberration of the light beam as the error due to the tilt, by a liquid crystal panel disposed on the optical axis for correcting the aberration.

8. A method for correcting aberration resulting from a tilt in an angle between an optical axis of a light beam and a surface of an information recording medium on which the light beam is irradiated, comprising:

determining based on stored tilt correction data an initial tilt correction amount for an optical pickup positioned to irradiate the light beam at a desired position on the surface of said information recording medium;

actuating a tilt servo with said optical pickup positioned to irradiate the light beam at the desired position to thereby determine a final tilt correction amount for correcting the aberration, the tilt servo process being started using the initial tilt correction amount; and correcting the aberration based on the final tilt correction amount.

9. A tilt correction method according to claim 8, wherein said information recording medium is an optical disk.

10. A tilt correction method according to claim 8, wherein the stored tilt correction data is derived from tilt correction amounts at a plurality of sampling points on the surface of said information recording medium.

11. A tilt correction method according to claim 8, wherein the stored tilt correction data is derived from an interpolation of tilt correction amounts at a plurality of sampling points on the surface of said information recording medium.

12. A tilt correction method according to claim 8, further comprising:

storing the final tilt correction amount with the stored tilt correction data.

13. A tilt correction method according to claim 8, wherein the stored tilt correction data is generated by:

prior to a recording or reproducing operation, actuating the tilt servo at a plurality of sampling positions on the surface of said information recording medium to determine at each of the sampling positions a tilt correction amount for correcting aberration resulting from the tilt in the angle between the optical axis of the light beam emitted by said optical pickup and the surface of said information recording medium; and storing in a memory the tilt correction amounts for each of the sampling points.

14. A tilt correction method according to claim 13, wherein the sampling positions are arranged radially on the information recording medium.

15. A tilt correction method according to claim 8, wherein the aberration is corrected by providing a phase difference to the light beam irradiated by said optical pickup.

16. A tilt correction method according to claim 15, wherein the phase difference is provided by adjusting a driving voltage of a liquid crystal display panel in accordance with the final tilt correction amount.

* * * * *